US012580761B2

(12) United States Patent
Liu

(10) Patent No.: US 12,580,761 B2
(45) Date of Patent: Mar. 17, 2026

(54) PUBLIC KEY STORAGE WITH SECURE REMOTE UPDATE CAPABILITY

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 140 days.

(21) Appl. No.: 17/399,922

(22) Filed: Aug. 11, 2021

(65) Prior Publication Data

US 2023/0049387 A1     Feb. 16, 2023

(51) Int. Cl.
| | |
|---|---|
| *H04L 9/16* | (2006.01) |
| *H04L 9/08* | (2006.01) |
| *H04L 9/40* | (2022.01) |
| *H04L 29/06* | (2006.01) |

(52) U.S. Cl.
CPC .............. *H04L 9/16* (2013.01); *H04L 9/0825* (2013.01); *H04L 63/0442* (2013.01)

(58) Field of Classification Search
CPC ................................. H04L 9/16; H04L 9/0825
See application file for complete search history.

(56) References Cited

U.S. PATENT DOCUMENTS

| | | | | |
|---|---|---|---|---|
| 6,009,524 A | * | 12/1999 | Olarig ................... | G06F 21/572 |
| | | | | 709/225 |
| 7,174,465 B2 | * | 2/2007 | Freeman ................. | G06F 21/57 |
| | | | | 713/170 |

| | | | | |
|---|---|---|---|---|
| 8,590,040 B2 | * | 11/2013 | Ghetie .................. | G06F 21/572 |
| | | | | 713/1 |
| 10,880,099 B2 | * | 12/2020 | Kumar Ujjwal ...... | G06F 21/577 |
| 11,184,157 B1 | * | 11/2021 | Gueron ..................... | H04L 9/14 |
| 2005/0123142 A1 | * | 6/2005 | Freeman ............... | H04L 9/0891 |
| | | | | 713/155 |
| 2005/0216753 A1 | * | 9/2005 | Dailey .................... | G06F 8/654 |
| | | | | 713/191 |
| 2006/0026429 A1 | * | 2/2006 | Kudo ..................... | G06F 21/575 |
| | | | | 713/173 |
| 2008/0130893 A1 | * | 6/2008 | Ibrahim ................ | G06F 21/572 |
| | | | | 380/277 |
| 2008/0244249 A1 | * | 10/2008 | Zimmer .................. | G06F 21/57 |
| | | | | 713/1 |
| 2008/0320313 A1 | * | 12/2008 | Awad ..................... | G06F 21/567 |
| | | | | 713/189 |
| 2011/0113181 A1 | * | 5/2011 | Piwonka ................... | G06F 8/65 |
| | | | | 711/E12.007 |
| 2011/0307712 A1 | * | 12/2011 | Sakthikumar ......... | G06F 21/572 |
| | | | | 713/189 |

(Continued)

FOREIGN PATENT DOCUMENTS

| | | | | |
|---|---|---|---|---|
| EP | 2395449 A1 | * | 12/2011 | ............... G06F 9/22 |

*Primary Examiner* — Phy Anh T Vu

(74) *Attorney, Agent, or Firm* — Greenberg Traurig

(57)     ABSTRACT

The disclosed embodiments relate to a memory device. In one embodiment, a memory device is disclosed comprising a storage array, the storage array including a first region, the first region storing a server public key associated with a server, and a key table; and a controller configured to: receive a message from the server, the message including a command modifying the key table, validate the message using the server public key, and modify the key table based on the message.

18 Claims, 6 Drawing Sheets

300

(56)        References Cited

U.S. PATENT DOCUMENTS

| | | | |
|---|---|---|---|
| 2014/0095886 A1* | 4/2014 | Futral | G06F 21/57 |
| | | | 713/187 |
| 2014/0149730 A1* | 5/2014 | Joshi | G06F 21/572 |
| | | | 713/2 |
| 2016/0048688 A1* | 2/2016 | Flynn | G06F 21/6281 |
| | | | 713/193 |
| 2017/0242719 A1* | 8/2017 | Tsirkin | G06F 21/602 |
| 2019/0312851 A1* | 10/2019 | Campagna | H04L 63/0823 |
| 2019/0394042 A1* | 12/2019 | Peddada | H04L 9/0894 |
| 2020/0320200 A1* | 10/2020 | Singh | G06F 8/65 |
| 2021/0021422 A1* | 1/2021 | Schlameuss | H04L 9/3234 |
| 2021/0234700 A1* | 7/2021 | Ali | H04L 9/3226 |
| 2023/0027315 A1* | 1/2023 | Liu | G06F 11/2284 |

* cited by examiner

300

PUBLIC KEY STORAGE WITH SECURE REMOTE UPDATE CAPABILITY

TECHNICAL FIELD

At least some embodiments disclosed herein relate to memory devices in general, and more particularly, but not limited to providing a secure mechanism for updating public keys stored by a memory device.

BACKGROUND

A memory subsystem can include one or more memory devices that store data. The memory devices can be, for example, non-volatile memory devices and volatile storage area devices. A host system can utilize a memory subsystem to store data at the memory devices and retrieve data from the memory devices.

BRIEF DESCRIPTION OF THE DRAWINGS

The embodiments are illustrated by way of example and not limitation in the figures of the accompanying drawings in which identical references indicate similar elements.

DETAILED DESCRIPTION

Figure 1:
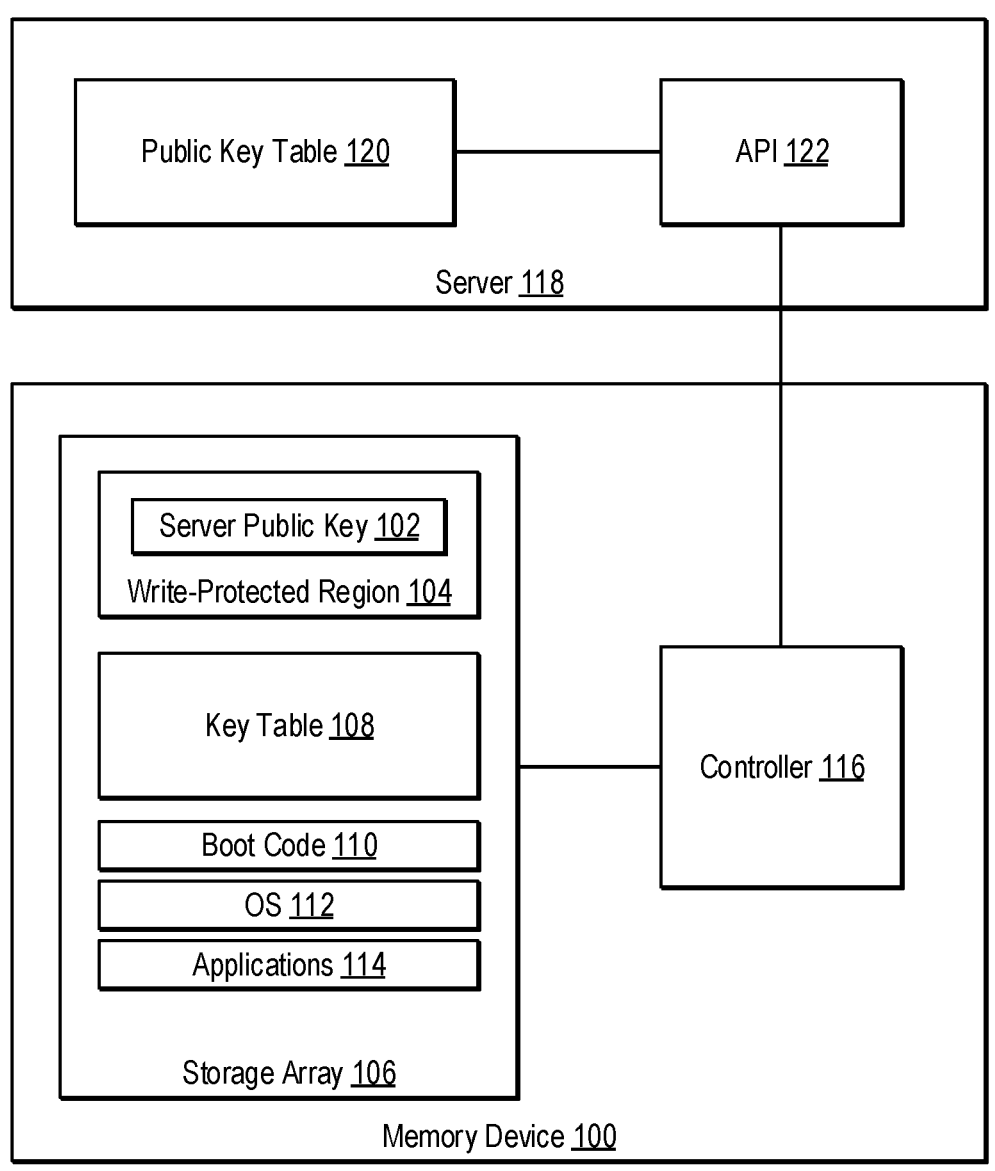
FIG. 1 is a block diagram of a memory device and remote server according to some embodiments.

In an embodiment, a method includes a server or other device generating or receiving an initial set of public keys. The server can use a secure command signed using a private key to update, add, or remove a public key the memory device stores. The memory device validates the command by, for example, determining if the server generated the signature using the server's secure private key. If the memory device validates the signature, the memory device can add the public key to a table of public keys. The aforementioned process can further be applied to other operations (e.g., removing a public key, replacing a public key, etc.).

In another embodiment, a method includes a client issuing a request to change the public key of a device to a server. The server validates the request (e.g., via signature validation) and returns a replacement message that includes the new public key and a signature. The client transmits the replacement message to a memory device. The memory device validates the replacement message and updates the public key if the replacement message is valid. In one embodiment, the replacement message can be signed with a private key of the server while the memory device stores a second public key only shared between the memory device and server. In another embodiment, the replacement message could be signed with a client private key, and the memory device stores a corresponding client public key.

In another embodiment, a client can sign a message with its private key. The client can then transmit the message to the memory device over a bus. The memory device validates the message using a corresponding public key stored in its key table and returns a success or failure message. In some embodiments, the location of the public key is fixed and standard; therefore, the client doesn't need to save any keys but can utilize the fixed location to fetch the key.

In another embodiment, a memory device stores a server public key in a read-only portion of memory, standardized across devices. In some embodiments, secure boot, operating systems, and even applications can all read the public key. A server stores a corresponding private key. The memory device has a dedicated memory location as a public key table (e.g., key slots). Secure boot, operating systems, and even applications can all read the public key table. The memory device uses the server public key to secure communication with the server. The memory device can use public keys in the public key table for other purposes, such as when updating a boot image, checking the signature of the boot image, and verifying a new boot image is valid before updating the boot image. Different key slots can be assigned to different users who have been granted permission to use the key slot. For example, a public key in slot one may be the key for updating a boot image, and the public key in slot two may be the key to updating an operating system driver. Whenever the private key corresponding to a public key in the public key table needs to be changed (e.g., when lost or compromised), a server can send a key update command to the memory device to replace the public key in the table. In some embodiments, write protection is provided by a jumper, which is put in the write protection position. Therefore, to change the write protection, a user needs to physically remove the jumper, so the memory is writable. Then the memory device can write the new public key in response to a command from the server. Thus, physical access to the device is needed to update the server's public key and the update usually can only be done in manufacturer's factory.

In the following embodiments, a server public key is used only for secure commands, such as changing public keys in the public key table. Such commands are generally not used very often, and server public keys can also be updated when necessary, such as through a routine updates. Keys in the public key table are used for other purposes such as verifying the signature of boot images when updating the same. These public keys in the public key table can be updated whenever necessary, such as the corresponding private key is lost or compromised or via routine updates.

FIG. 1 is a block diagram of a memory device and remote server according to some embodiments.

In the illustrated embodiment, a memory device 100 is communicatively coupled to a server 118. The memory device 100 includes a controller 116 controlling access to a storage array 106. The storage array 106 includes a write-protected region 104 storing a server public key 102. The storage array 106 further includes a key table 108, boot code 110, operating system 112, and applications 114. The server 118 includes an application programming interface (API) such as API 122 as well as a public key table 120. In some embodiments, the memory device 100 can be embedded or communicatively coupled to a client such as a processor or general-purpose computing system.

In an embodiment, a memory device 100 can comprise a non-volatile memory device such as an SSD, a flash drive, a universal serial bus (USB) flash drive, an eMMC drive, a Universal Flash Storage (UFS) drive, a secure digital (SD) card, or a hard disk drive (HDD).

In an embodiment, storage array 106 can comprise an array of memory cells. In one embodiment, a storage array 106 can comprise an array of NAND Flash cells. One type of memory cell, for example, single-level cells (SLC), can store one bit per cell. Other types of memory cells, such as multi-level cells (MLCs), triple-level cells (TLCs), quad-level cells (QLCs), and penta-level cells (PLCs), can store multiple bits per cell. In some embodiments, the storage array 106 can include one or more arrays of memory cells such as SLCs, MLCs, TLCs, QLCs, PLCs, or any combination of such. In some embodiments, the storage array 106 can include an SLC portion, an MLC portion, a TLC portion, a QLC portion, and/or a PLC portion of memory cells. The memory cells of the storage array 106 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 100 can be based on any other type of non-volatile memory, such as read-only memory (ROM), phase-change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, electrically erasable programmable read-only memory (EEPROM), etc.

In the illustrated embodiment, the storage array 106 includes a write-protected region 104. In one embodiment, the write-protected region 104 can be set as write-only when one or more jumpers (not illustrated) are manually configured. In another embodiment, the write-protected region 104 can be enabled and disabled via a secure command. In some embodiments, this secure command can be signed with a private key corresponding to a public key stored by the memory device 100. In some embodiments, this public key comprises server public key 102. Thus, the memory device 100 can validate the command to enable or disable write protection and can allow for updates to the server public key 102 after authenticating a command to do so. In some embodiments, a first secure command (signed with the server private key) can be issued to disable write-protection. A second secure command (signed with the server private key) can then be issued to update the server public key (described herein). Finally, a third secure command (signed with the server private key) to re-enable write protection, thus allowing for updates to the server private key. While the foregoing description emphasizes the updates to write-protected region 104, the same methodology can be applied to update key table 108. In such an embodiment, the key table 108 can be stored in write-protected region 104 as well. In some embodiments, the write-protected region 104 can comprise a read-only portion of the storage array 106. As illustrated, the write-protected region 104 can store a public key of server 118. In an embodiment, the server writes the server public key 102 to the write-protected region 104 during manufacturing. In some embodiments, the server can update the server public key 102 periodically. In some embodiments, the write-protected region 104 can be located in a standardized location across all memory devices similar to memory device 100. In an embodiment, all applications on the memory device 100 can access the write-protected region 104. Thus, boot code 110, operating system 112, and applications 114 can all access the write-protected region 104.

In the illustrated embodiment, the storage array 106 additionally includes a key table 108 that stores a plurality of public key values. In one embodiment, the key table 108 can include a second region of the storage array 106 that can be written to or modified. In some embodiments, the key table 108 can include a write-protected region that can be software-controlled. That is, in some embodiments, controller 116 can be configured to confirm commands changing the key table 108 prior to issuing such commands. For example, in some embodiments, the controller 116 can validate a command accessing key table 108 by using the server public key 102 to validate a digital signature included in the command. Since the private key corresponding to the server public key 102 is only known by the server 118, only the server 118 can issue commands to modify the key table 108.

In the illustrated embodiment, while only boot code 110, operating system 112, and applications 114 are illustrated, other types of applications or code can be resident in storage array 106. In the illustrated embodiment, these applications or code can all access the key table 108 and use the public keys stored in the key table 108. In one embodiment, each application or code is associated with a given slot in the key table 108. Thus, the applications or code can quickly read a corresponding key from the key table 108 and use the key to perform operations such as performing signature validation. In some embodiments, controller 116 can perform such operations.

In some embodiments, different public keys in key table 108 can be assigned to different users of a client including the memory device 100. Different key slots can be assigned to different users who has been granted the permission to use the key slot. For example, a public key in slot one may be the key for updating a secure boot image and a public key in slot 2 may be the public key to update an operating system driver for a certain device etc.

In the illustrated embodiment, a client including the memory device 100 can issue commands to the server 118 via the API 122. In an embodiment, the API 122 can comprise a remote endpoint that allows a calling party to issue requests to the server 118. In one embodiment, the client including the memory device 100 can authenticate to the server using a login and password or via a key-based authentication protocol. After authenticating, the client can issue requests to initialize, update, add, or remove public keys from a public key table 120 associated with the memory device 100. In response, the server 118 can validate the request, update its own public key table 120 and issue a message back to the memory device 100 (e.g., via the client) to cause the memory device 100 to update its own key table 108. Details of these operations are provided in the following FIGS. 2 and 3.

In the illustrated embodiment, the controller 116 can further be configured to receive requests from a client to confirm digital signatures. In such an embodiment, depicted in FIG. 4, the controller receives a signed message and loads a public key from the key table 108 corresponding to the sender or the data. The controller 116 can then confirm that the provided digital signature is valid, confirming that the underlying sender is the appropriate sender. In some embodiments, the signature validation can be performed by the client device itself. In this case, the client can simply read the public key from the key table 108 and confirm the signature itself without relying on the controller 116.

Figure 2:
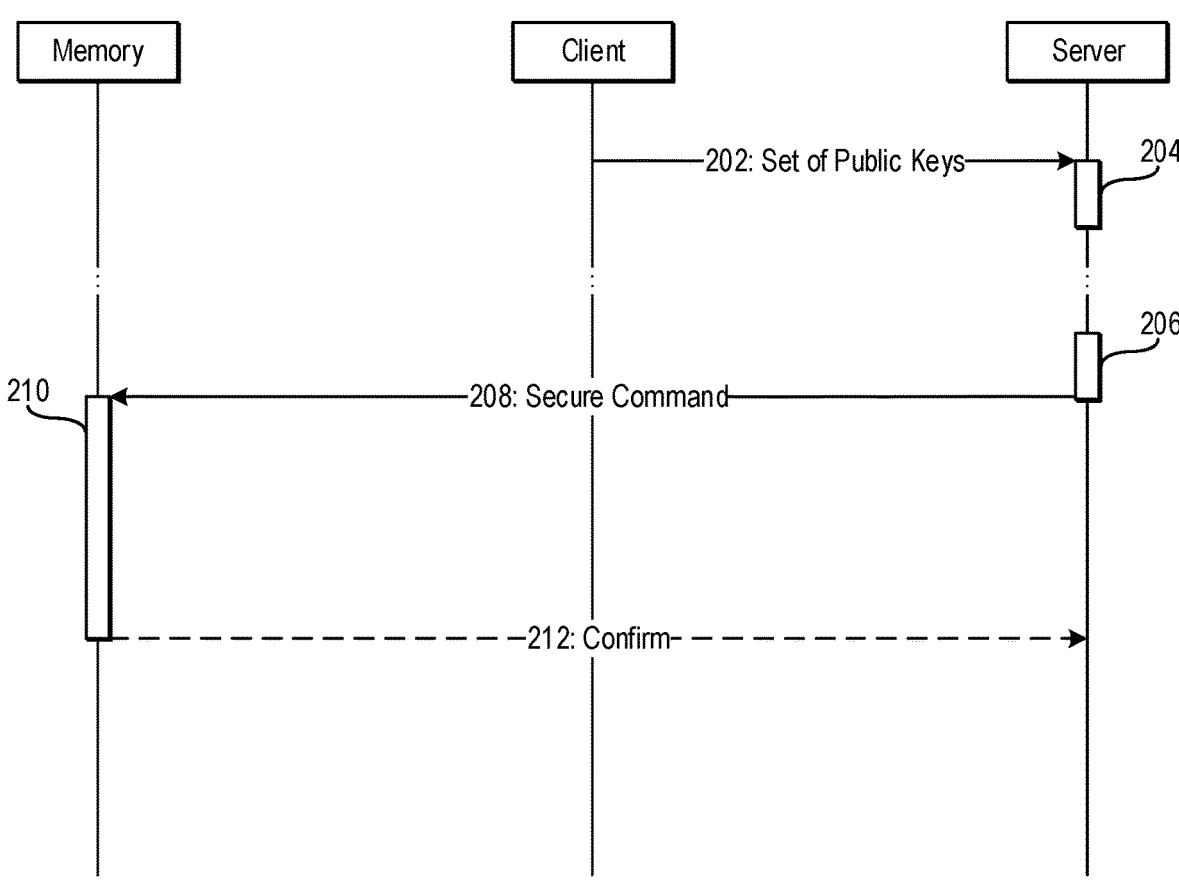
FIG. 2 is a flow diagram illustrating a method for writing to a public key table according to some embodiments.

FIG. 2 is a flow diagram illustrating a method for writing to a public key table according to some embodiments.

In message 202, a client transmits a message to a server, and the server receives the message. In the illustrated embodiment, a client can comprise any computing device communicatively coupled to a memory device and server. For example, the client can comprise a processor or general-purpose computer system containing the memory device.

In an embodiment, the message includes a set of public keys. In some embodiments, the set of public keys can comprise an initial set of public keys. In some embodiments, the client can provide the initial set of public keys when the illustrated memory device is manufactured by a manufacturer. In an alternative embodiment, the server may not receive the message 202. In such an embodiment, the server may generate its own set of public keys. If implemented, client can digitally sign message 202 using a private key. In such an embodiment, the server can either access a corresponding public key stored locally or retrieve such a public key from a trusted certificate authority (CA).

In block 204, the server persists the set of public keys to a storage device. In one embodiment, the server maintains a table of public keys. In such an embodiment, the server can associate each public key in the set of public keys with a given client or memory device. In some embodiments, the server can associate each public key with both the client and the memory device. In some embodiments, the server can associate a public key with a client by associating the public key with a unique client identifier. In some embodiments, the server can associate a public key with a memory device by associating the public key with a unique identifier assigned to the memory device during manufacturing.

As illustrated by the dash lines of FIG. 2, message 202 and block 204 can be performed at any time prior to block 206. In one embodiment, the client transmits message 202, and the server performs block 204 during the initial manufacturing of the memory device. In some embodiments, however, message 202 and block 204 can be repeated as necessary. Thus, in some embodiments, the server can issue block 206 (described next) asynchronously at any point after receiving message 202 and executing block 204.

The server generates a secure message in block 206 and transmits the secure message 208 at some point after completing block 204. As discussed, the server can transmit secure message 208 once, many times, and throughout the life of the memory device. In the illustrated embodiment, the server transmits secure message 208 directly to a memory device (e.g., through a controller of the memory device). In some embodiments, the client can mediate the secure message 208 on behalf of the memory device.

Secure message 208 can take various forms. In an embodiment, secure message 208 can comprise a message to persist a new public key to a table of the memory device. In such an embodiment, secure message 208 can comprise the value of the public key. In another embodiment, secure message 208 can comprise a message to update an existing public key stored by the memory device with a new public key included in the message. In such an embodiment, secure message 208 can identify the public key by including the current value of the public key or by including a table offset of the public key. In another embodiment, secure message 208 can comprise a message to remove a public key. In such an embodiment, secure message 208 can identify the public key by including the current value of the public key or by including a table offset of the public key. Certainly, secure message 208 can comprise any other message that affects a public key.

In an embodiment, the server digitally signs the secure message 208 as part of block 206. In one embodiment, the server digitally signs the secure message 208 using a private key that the server stores and secures (e.g., in a hardware security module). In some embodiments, a certificate authority (CA) stores a corresponding public key.

In block 210, the memory device receives secure message 208, validates the digital signature of secure message 208, and processes secure message 208. In one embodiment, the memory device can receive the secure message 208 directly from the server. In another embodiment, the client can receive the secure message 208 and forward the secure message 208 to the memory device.

In one embodiment, the memory device can validate the digital signature of the secure message 208 by loading a public key of the server. In one embodiment, the memory device stores the public key in a write-protected region of a storage array. Thus, in some embodiments, the memory device does not need network access to load a public key and can validate the signature of the message 208 directly on the memory device. In other embodiments, the memory device can retrieve the public key from a CA or similar entity. In some embodiments, the memory device can perform both operations. For example, the memory device can first attempt to read a server public key from a CA and fall back to loading the locally stored server public key. Notably, since the server public key is stored in a secure region of the memory device, the memory device can reasonably ensure that the server public key is valid.

In an embodiment, the memory device can ignore the secure message 208 if the memory device cannot validate the signature of the secure message 208. If the memory device validates the digital signature of the secure message, the memory device can proceed to process the message. In one embodiment, a controller can store various microcode or instructions to process each type of message (e.g., to update, remove, or add public keys). For update and remove commands, the memory device can identify an existing public key in a table based on an identifier of the public key in the secure message 208 and replace or remove the public key, respectively. For insert/add commands, the memory device can insert a public key in the secure message 208 into the table. In some embodiments, the memory device can insert the public key to the end of the table.

After processing the secure message 208, the memory device can transmit a confirmation message 212 to the server. In some embodiments, transmitting the confirmation message 212 can be optional. In one embodiment, the confirmation message 212 can include a success or failure indicator (e.g., flag). In one embodiment, in response to the confirmation message 212, the server can update its own table of public keys. For example, if the server requests the memory device remove a public key in the secure message 208, the server can delay removing its own copy of the public key until receiving the confirmation message 212. The server can employ similar delay mechanisms for update and insert/add commands. In this manner, the server can ensure that its own public key table is consistent with the memory device's public key table.

Figure 3:
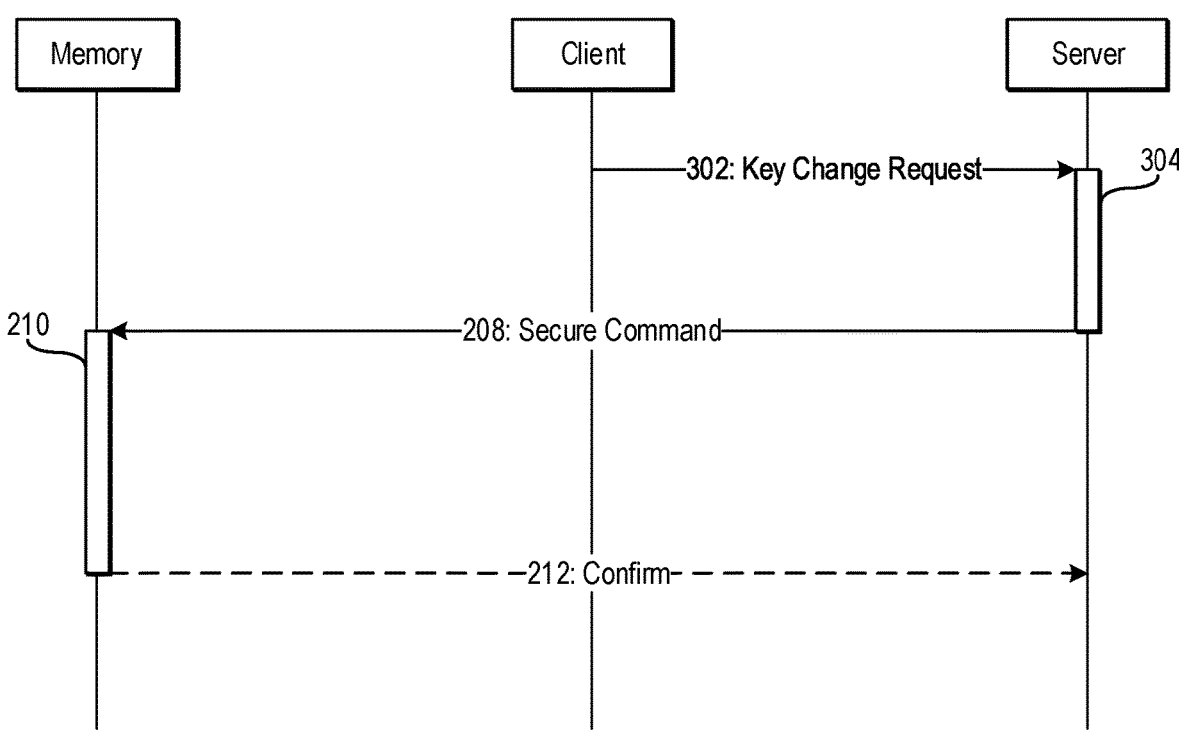
FIG. 3 is a flow diagram illustrating a method for updating a public key according to some embodiments.

FIG. 3 is a flow diagram illustrating a method for updating a public key according to some embodiments.

The client transmits key change request message 302 to the server. In one embodiment, key change request message 302 can comprise a message to perform an operation on a public key or set of public keys. In the illustrated embodiment, key change request message 302 can comprise a command to update a public key that the server persisted, add a new public key to the server's table of public keys, or remove a public key from the server.

If key change request message 302 is a command to update or remove a public key, the command can include an identifier of the public key. In one embodiment, the identifier of the public key can comprise a portion of the public key itself. For example, the identifier of the public key can comprise a base 64-encoded Rivest-Shamir-Adleman public key. In other embodiments, the identifier of the public key can comprise a unique value assigned by the server (e.g., an index of the public key in a database of public keys). If the key change request message 302 is a command to update a public key, the message can further include a public key that should replace the currently stored public key.

If key change request message 302 is a command to add a public key, the command can include the public key value itself. In both scenarios, the client can digitally sign the command as described previously. In other embodiments, the client can authenticate with the server prior to issuing the key change request message 302, and a trusted session, such as a transport layer security (TLS) session, can secure the key change request message 302. The server can implement various other techniques to authenticate and authorize the client and key change request message 302.

In block 304, the server validates and processes the message. In one embodiment, the server can first confirm a digital signature of the key change request message 302. If the server cannot confirm the digital signature, the server can return an error message (not illustrated) and ignore further processing. In an embodiment, the server can further confirm that an authenticated user is authorized to change or add public keys based on a set of permissions associated with an organization that includes a user operating the client (or the client itself).

After confirming that key change request message 302 is valid and authorized, the server can then proceed to process key change request message 302. The server can process key change request message 302 according to the type of message. For update messages, the server can access a currently stored public key and replace or otherwise update the currently stored key with the new public key included in the update command. For messages to add a public key, the server can associate the new public key with the client or memory device (as previously discussed) and persist the new public key to a database table or other stored medium. In response to a remove message, the server can remove the identified public key. As discussed, in some embodiments, these operations can be buffered or otherwise delayed until a confirmation is received.

Finally, in block 304, the server generates a secure command corresponding to the key change request message 302. Thus, if the client transmits a key change request message 302 updating a public key, the server generates a corresponding secure message 208 to transmit to the memory device. In response, the memory device validates the secure message 208 and processes the secure message 208 in block 210 before (optionally) returning a confirmation message 212. Details of messages 208 and 212 and block 210 were described in FIG. 2 and are not repeated herein.

Figure 4:
FIG. 4 is a flow diagram illustrating a method for signing messages using a public key table according to some embodiments.
Figure 4:
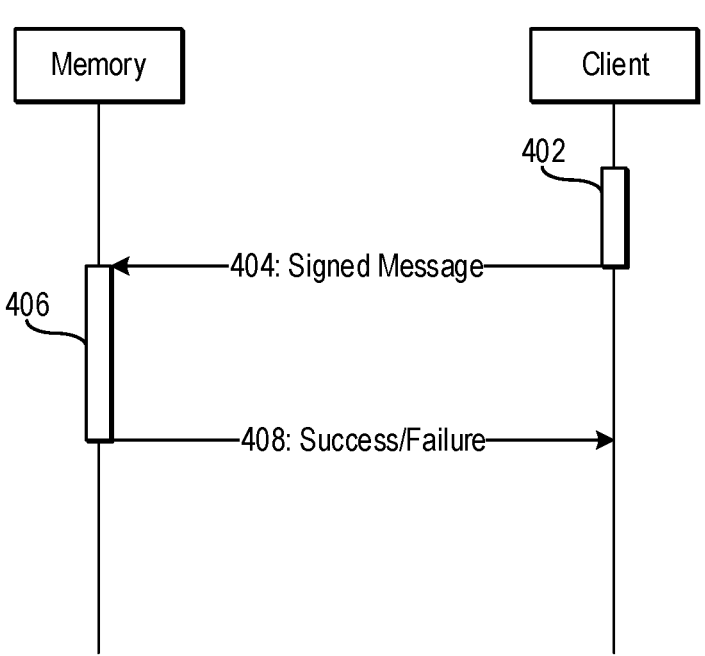

FIG. 4 is a flow diagram illustrating a method for signing messages using a public key table according to some embodiments.

In block 204, a client generates a message. In one embodiment, the message can comprise any message and no limit is placed on the type of message. For example, the message can comprise a payment request, an email, a low-level system control message, etc. In one embodiment, the client signs the message using a private key. In one embodiment, the client adds a digital signature to the message as part of the signature process.

In one embodiment, the client can transmit the signed message 404 to the memory device. In one embodiment, the memory device can attribute the signed message 404 to the client. In an embodiment, the signed message 404 can include attribute information allowing the memory device to identify the sender. In other embodiments, the memory device can identify the sender based on transport properties (e.g., media access control address, port number, etc.) of the signed message 404.

In block 406, the memory device identifies a public key in the public key table based on the identity of the sender. For example, if the client comprises an operating system, the memory device can load a corresponding operating system public key from the public key table. After loading the public key, the memory device can validate a digital signature included in the signed message 404. In one embodiment, the memory device uses the identified public key to validate the digital signature.

In response to the validation in block 406, the memory device can correspondingly return a status message 408 in response to the validating, the status message indicating whether the validating was successful or was a failure. Thus, in the illustrated embodiment, the memory device can validate a digital signature of a signed message 404 and thus confirm that the private key of the client corresponds to a public key set by a server, as described in FIGS. 2 and 3. In this manner, an unauthorized client cannot issue messages. Specifically, in some embodiments, all clients of a computing system can be required to confirm their data with the process of FIG. 4 prior to proceeding. For example, A u-boot layer can confirm its u-boot image prior to proceeding using the process of FIG. 4.

Figure 5:
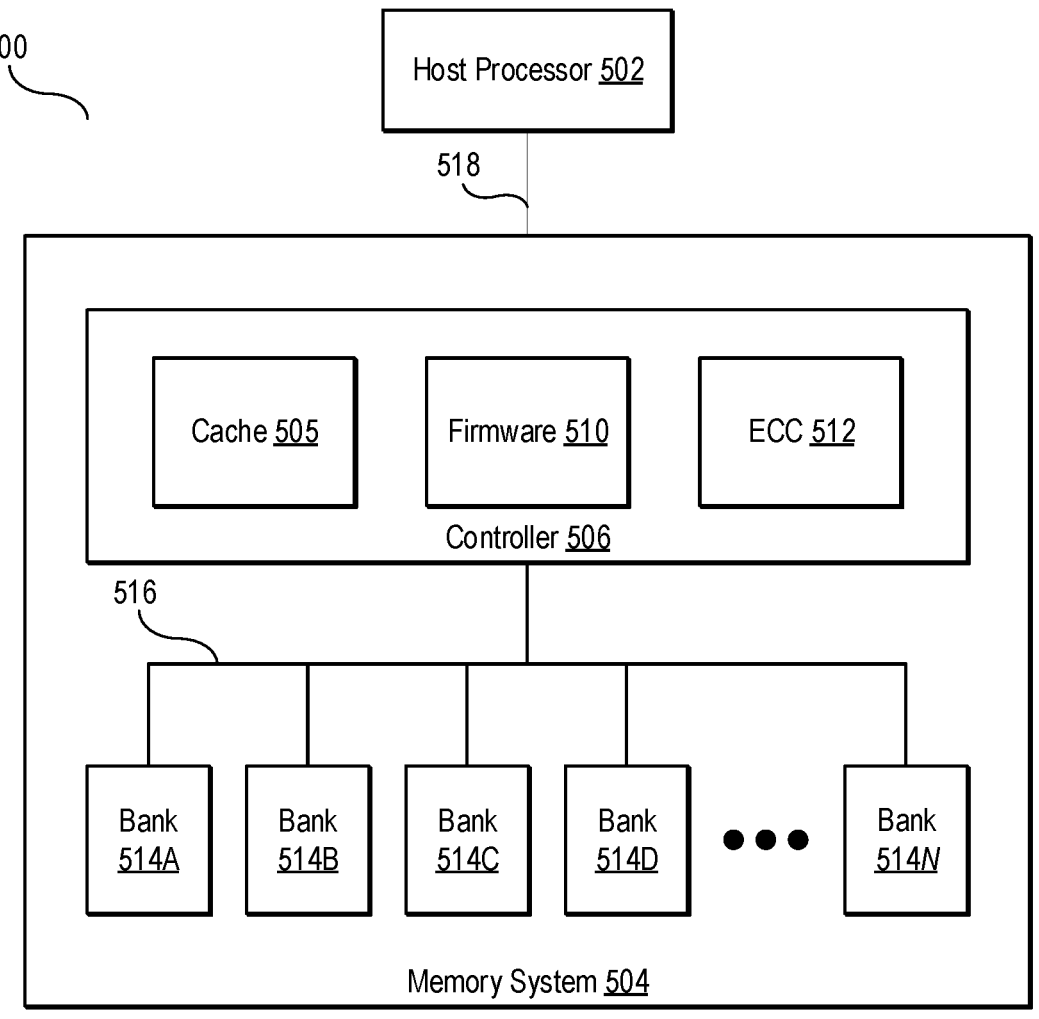
FIG. 5 is a block diagram illustrating a memory system according to some embodiments.

FIG. 5 is a block diagram illustrating a memory system according to some embodiments. Various features of FIG. 5 have been described logically in the description of FIG. 1, and those features are incorporated herein by reference in their entirety.

As illustrated in FIG. 5, a computing system 500 includes a host processor 502 communicatively coupled to a memory system 504 via a bus 518. The memory system 504 comprises a controller 506 communicatively coupled to one or more memory banks 514A-514N, forming a memory array via a bus/interface 516. As illustrated, controller 506 includes a local cache 505, firmware 510, and an error correction code (ECC) module 512.

In the illustrated embodiment, a host processor 502 can comprise any type of computer processor, e.g., a central processing unit (CPU), graphics processing unit (GPU), or other types of general-purpose or special-purpose computing devices. The host processor 502 includes one or more output ports that allow for the transmission of address, user, and control data between the host processor 502 and the memory system 504. In the illustrated embodiment, this communication is performed over bus 518. In one embodiment, bus 518 comprises an input/output (I/O) bus or a similar type of bus.

The memory system 504 is responsible for managing one or more memory banks 514A-514N. In one embodiment, the banks 514A-514N comprise NAND Flash dies or other configurations of non-volatile memory. In one embodiment, the memory banks 514A-514N comprise a memory array.

The banks 514A-514N are managed by controller 506. In some embodiments, controller 506 comprises a computing device configured to mediate access to and from banks 514A-514N. In one embodiment, controller 506 comprises an ASIC or other circuitry installed on a printed circuit board housing the banks 514A-514N. In some embodiments, controller 506 may be physically separate from the banks 514A-514N. The controller 506 communicates with the banks 514A-514N over the interface 516. In some embodiments, this interface 516 comprises a physically wired (e.g., traced) interface. In other embodiments, interface 516 comprises a standard bus for communicating with banks 514A-514N.

Controller 506 comprises various modules 505-512. In one embodiment, the various modules 505-512 comprise various physically distinct modules or circuits. In other embodiments, modules 505-512 may completely (or partially) be implemented in software or firmware.

As illustrated, firmware 510 comprises the core of the controller and manages all operations of controller 506. The firmware 510 may implement some or all of the methods described above.

Figure 6:
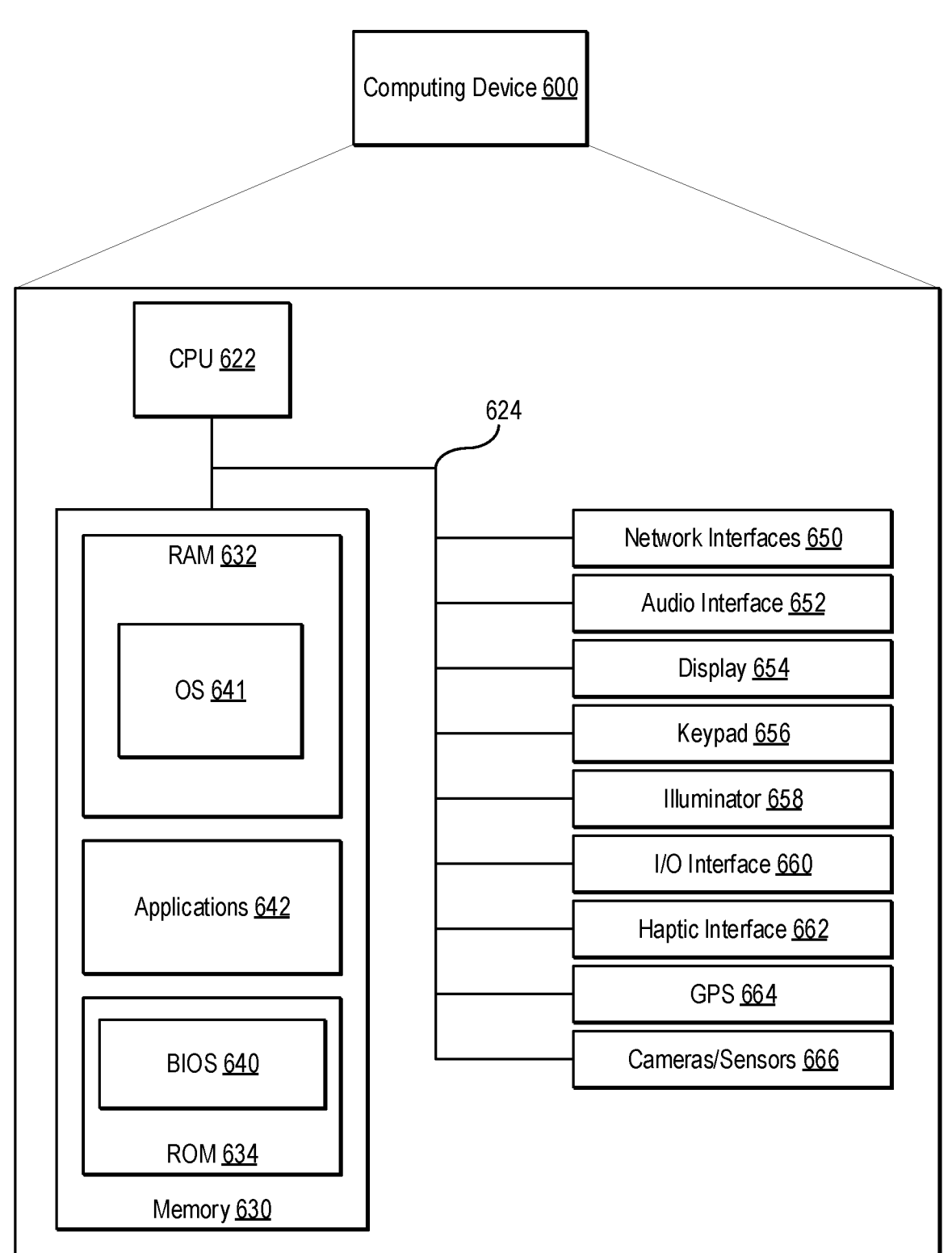
FIG. 6 is a block diagram illustrating a computing device showing an example of a client or server device used in the various embodiments of the disclosure.

FIG. 6 is a block diagram illustrating a computing device showing an example of a client or server device used in the various embodiments of the disclosure.

The device 600 can include more or fewer components than those shown in FIG. 6, depending on the deployment or usage of the device 600. For example, a server computing device, such as a rack-mounted server, may not include an audio interface 652, display 654, keypad 656, illuminator 658, haptic interface 662, Global Positioning System (GPS) receiver 664, or cameras/sensors 666. Some devices can include additional components not shown, such as graphics processing unit (GPU) devices, cryptographic co-processors, artificial intelligence (AI) accelerators, or other peripheral devices.

As shown in the figure, device 600 includes a central processing unit, CPU 622, in communication with a mass memory 630 via a bus 624. The device 600 also includes a network interface 650, an audio interface 652, a display 654, a keypad 656, an illuminator 658, an input/output interface 660, a haptic interface 662, a GPS receiver 664, and camera(s) or other optical, thermal, or electromagnetic sensors such as cameras/sensors 666. Device 600 can include one camera/sensor or a plurality of cameras/sensors 666. The positioning of the cameras/sensors 666 on the device 600 can change per device 600 model, per device 600 capabilities, and the like, or some combination thereof.

In some embodiments, the CPU 622 can comprise a general-purpose CPU. The CPU 622 can comprise a single-core or multiple-core CPU. The CPU 622 can comprise a system-on-a-chip (SoC) or a similar embedded system. In some embodiments, a GPU can be used in place of, or in combination with, a CPU 622. Mass memory 630 can comprise a dynamic random-access memory (DRAM) device, a static random-access memory device (SRAM), or a Flash (e.g., NAND Flash) memory device. In some embodiments, mass memory 630 can comprise a combination of such memory types. In one embodiment, the bus 624 can comprise a Peripheral Component Interconnect Express (PCIe) bus. In some embodiments, bus 624 can comprise multiple busses instead of a single bus.

Mass memory 630 illustrates another example of computer storage media for the storage of information such as computer-readable instructions, data structures, program modules, or other data. Mass memory 630 stores a basic input/output system, BIOS 640, for controlling the low-level operation of the device 600. In the illustrated embodiment, the BIOS 640 may be stored in a read-only memory (ROM)

such as ROM 634. The mass memory also stores an operating system 641 for controlling the operation of the device 600.

Applications 642 can include computer-executable instructions which, when executed by the device 600, perform any of the methods (or portions of the methods) described previously in the description of the preceding Figures. In some embodiments, the software or programs implementing the method embodiments can be read from a hard disk drive (not illustrated) and temporarily stored in RAM 632 by CPU 622. CPU 622 can then read the software or data from RAM 632, process them, and store them in RAM 632 again.

The device 600 can optionally communicate with a base station (not shown) or directly with another computing device. Network interface 650 is sometimes known as a transceiver, transceiving device, or network interface card (NIC).

The audio interface 652 produces and receives audio signals such as the sound of a human voice. For example, the audio interface 652 can be coupled to a speaker and microphone (not shown) to enable telecommunication with others or generate an audio acknowledgment for some action. Display 654 can be a liquid crystal display (LCD), gas plasma, light-emitting diode (LED), or any other type of display used with a computing device. Display 654 can also include a touch-sensitive screen arranged to receive input from an object such as a stylus or a digit from a human hand.

Keypad 656 can comprise any input device arranged to receive input from a user. Illuminator 658 can provide a status indication or provide light.

The device 600 also comprises an input/output interface 660 for communicating with external devices, using communication technologies, such as USB, infrared, Bluetooth®, or the like. The haptic interface 662 provides tactile feedback to a user of the client device.

The GPS receiver 664 can determine the physical coordinates of the device 600 on the surface of the Earth, which typically outputs a location as latitude and longitude values. GPS receiver 664 can also employ other geo-positioning mechanisms, including, but not limited to, triangulation, assisted GPS (AGPS), E-OTD, CI, SAI, ETA, BSS, or the like, to further determine the physical location of the device 600 on the surface of the Earth. In one embodiment, however, the device 600 can communicate through other components, provide other information that can be employed to determine the physical location of the device, including, for example, a MAC address, IP address, or the like.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to the desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any programming language. It will be appreciated that a variety of programming languages can be used to implement the teachings of the disclosure as described herein.

The present disclosure can be provided as a computer program product or software that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as read-only memory ("ROM"), random access memory ("RAM"), magnetic disk storage media, optical storage media, flash memory components, etc.

In this description, various functions and operations are described as being performed by or caused by computer instructions to simplify the description. However, those skilled in the art will recognize what is meant by such expressions is that the functions result from the execution of the computer instructions by one or more controllers or processors, such as a microprocessor. Alternatively, or in combination, the functions and operations can be implemented using special-purpose circuitry, with or without software instructions, such as using Application-Specific Integrated Circuit (ASIC) or Field-Programmable Gate Array (FPGA). Embodiments can be implemented using hardwired circuitry without software instructions or in combination with software instructions. Thus, the techniques are limited neither to any specific combination of hardware circuitry and software nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
a non-volatile storage array, the storage array including a first region and a second region, the first region comprising a write-protected portion of the storage array, and the write-protected portion storing a write-protected server public key associated with a server, and the second region comprising a rewritable portion of the storage array, the writable portion storing a writeable key table containing multiple independently updatable public keys associated with different applications or components, wherein the writable key table comprises a plurality of key slots, each key slot storing a public key and an associated permission indicator identifying a user authorized to use that key slot; and
a controller configured to:
receive a message from the server, the message including a key slot identifier, a digitally signed command for modifying a specific public key within an identified key slot of the writable key table and a digital signature generated using a private key corresponding to the server public key,
validate the message using the digital signature and the server public key prior to processing the digitally signed command, and modify the specific public key within an identified key slot of the writable key table based on the digitally signed command contained in the message after validating the digital signature of the message and verifying authorization to use the identified key slot, wherein modification of the specific public key enables or disables authentication capabilities for its respective associated application.

2. The memory device of claim 1, wherein the controller is further configured to modify the server public key in response to a secure command, the secure command is signed using a private key corresponding to the server public key.

3. The memory device of claim 1, wherein the message comprises a key update message including a new public key and wherein the controller is further configured to replace a public key in the writable key table with the new public key.

4. The memory device of claim 1, wherein the message comprises a key removal message and wherein the controller is further configured to remove a public key in the writable key table.

5. The memory device of claim 1, wherein the message comprises a key add message including a new public key and wherein the controller is further configured to add the new public key to the writable key table.

6. The memory device of claim 1, wherein the message includes the digital signature generated using the private key corresponding to the server public key and wherein the controller is further configured to validate the digital signature using the server public key.

7. The memory device of claim 1, wherein the controller is further configured to:
receive a second message from a sender, the second message including a signature generated using a private key of the sender;
identify a corresponding public key in the writable key table, the corresponding public key corresponding to the private key of the sender;
validate the second message using the corresponding public key; and return a status message in response to validating the second message, the status message indicating whether the validating was successful.

8. A method comprising:

receiving a message from a server, the message including a key slot identifier, a digital signature generated using a private key of the server, and a digitally signed command for modifying a specific public key within an identified key slot of a key table containing multiple independently updatable public keys associated with different applications or components, wherein the key table comprises a plurality of key slots, each key slot storing a public key and an associated permission indicator identifying a user authorized to use that key slot, the key table located in a writeable first region of a non-volatile storage array, the non-volatile storage array further comprising a write-protected region, the write-protected region storing a write-protected server public key associated with the server; and, reading the server public key corresponding to the private key from the write-protected region of the non-volatile storage array, the write-protected region being separate from the writable first region;

validating the digital signature using the server public key prior to processing the digitally signed command, and modifying the specific public key within the identified key slot of the key table based on the digitally signed command contained in the message after validating the digital signature of the message and verifying authorization to use the identified key slot, wherein modification of the specific public key enables or disables authentication capabilities for its respective associated application.

9. The method of claim 8, wherein the message comprises a key update message including a new public key and wherein modifying the key table based on the message comprises replacing a public key in the key table with the new public key.

10. The method of claim 8, wherein the message comprises a key removal message and wherein modifying the key table based on the message comprises removing a public key from the key table.

11. The method of claim 8, wherein the message comprises a key add message including a new public key and wherein modifying the key table based on the message comprises adding the new public key to the key table.

12. The method of claim 8, further comprising:

receiving a second message from a sender, the second message including a signature generated using a private key of the sender;

identifying a corresponding public key in the key table, the corresponding public key corresponding to the private key of the sender;

validating the second message using the corresponding public key; and returning a status message in response to validating the second message, the status message indicating whether the validating was successful.

13. A non-transitory computer-readable storage medium for tangibly storing computer program instructions capable of being executed by a computer processor, the computer program instructions defining steps of:

receiving a digitally signed message from a server, the message including a key slot identifier, a digital signature generated using a private key of the server, and a command for modifying a specific public key within an identified key slot of a key table containing multiple independently updatable public keys associated with different applications or components, wherein the key table comprises a plurality of key slots, each key slot storing a public key and an associated permission indicator identifying a user authorized to use that key slot, the key table located in a writeable first region of a storage array, the storage array further comprising a write-protected region, the write-protected region storing a write-protected server public key associated with the server; and, reading the server public key corresponding to the private key from a write-protected region of the storage array, the write-protected region being separate from the writable first region;

validating the digital signature using the server public key prior to processing the command, and modifying the specific public key within an identified key slot of the key table based on the command contained in the message after validating the digital signature of the message and verifying authorization to use the identified key slot, wherein modification of the specific public key enables or disables authentication capabilities for its respective associated application.

14. The non-transitory computer-readable storage medium of claim 13, wherein the message comprises a key update message including a new public key and wherein modifying the key table based on the message comprises replacing a public key in the key table with the new public key.

15. The non-transitory computer-readable storage medium of claim 13, wherein the message comprises a key removal message and wherein modifying the key table based on the message comprises removing a public key from the key table.

16. The non-transitory computer-readable storage medium of claim 13, wherein the message comprises a key add message including a new public key and wherein modifying the key table based on the message comprises adding the new public key to the key table.

17. The non-transitory computer-readable storage medium of claim 13, wherein the message includes the digital signature generated using a private key corresponding to the server public key and wherein validating the message using the server public key comprises validating the digital signature using the server public key.

18. The non-transitory computer-readable storage medium of claim 13 further comprising:

receiving a second message from a sender, the second message including a signature generated using a private key of the sender;

identifying a corresponding public key in the key table, the corresponding public key corresponding to the private key of the sender;

validating the second message using the corresponding public key; and returning a status message in response to validating the second message, the status message indicating whether the validating was successful.

* * * * *